Jan. 14, 1930.　　　P. L. HATFIELD　　　1,743,968
GREASE GUN
Filed Dec. 30, 1927　　　2 Sheets-Sheet 1
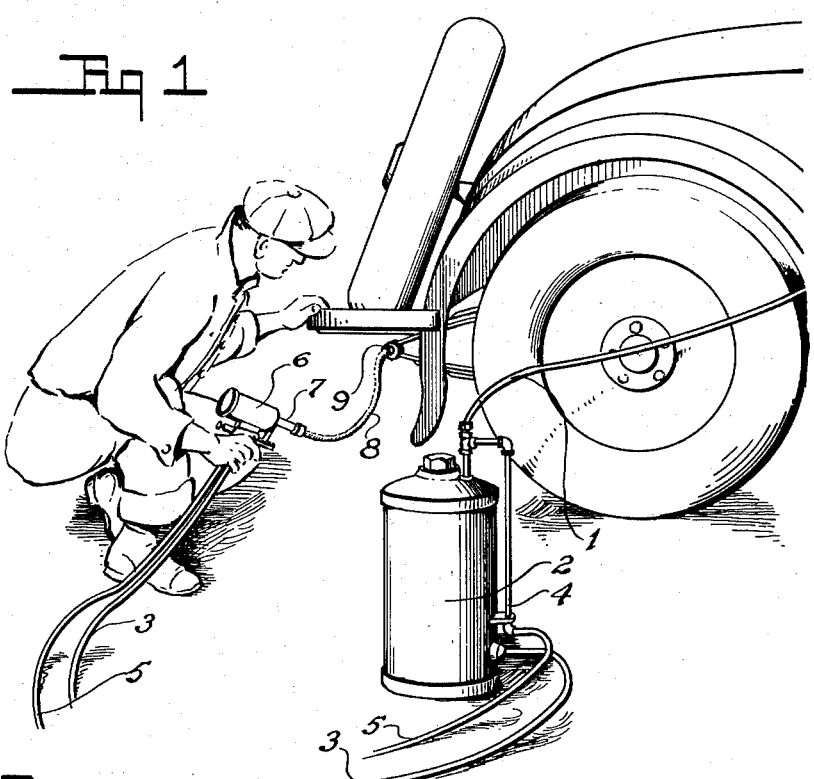
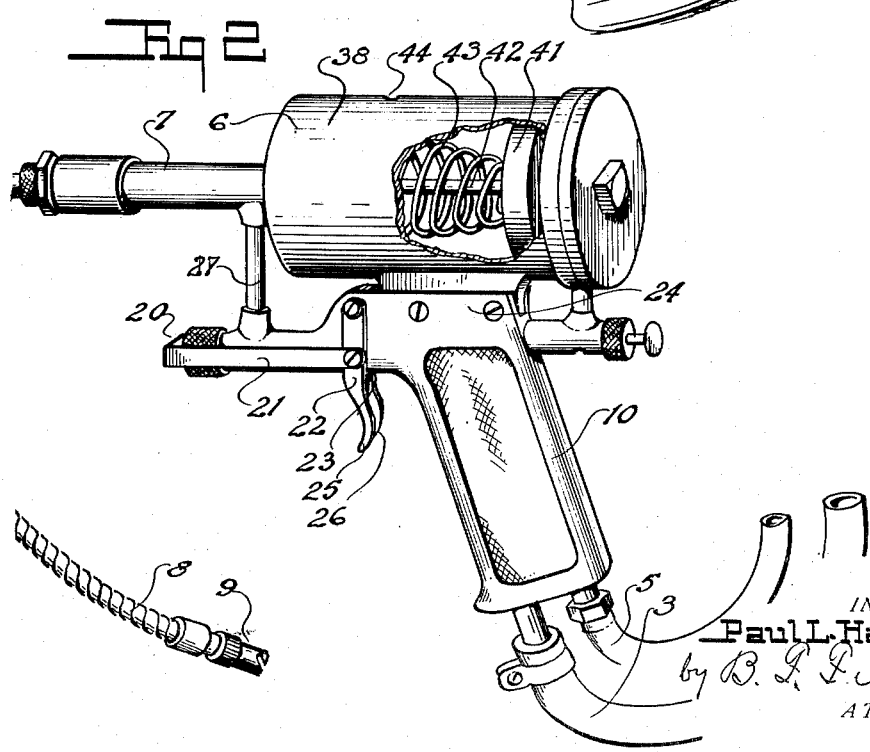
INVENTOR
Paul L. Hatfield
by B. L. Funk
ATTORNEY

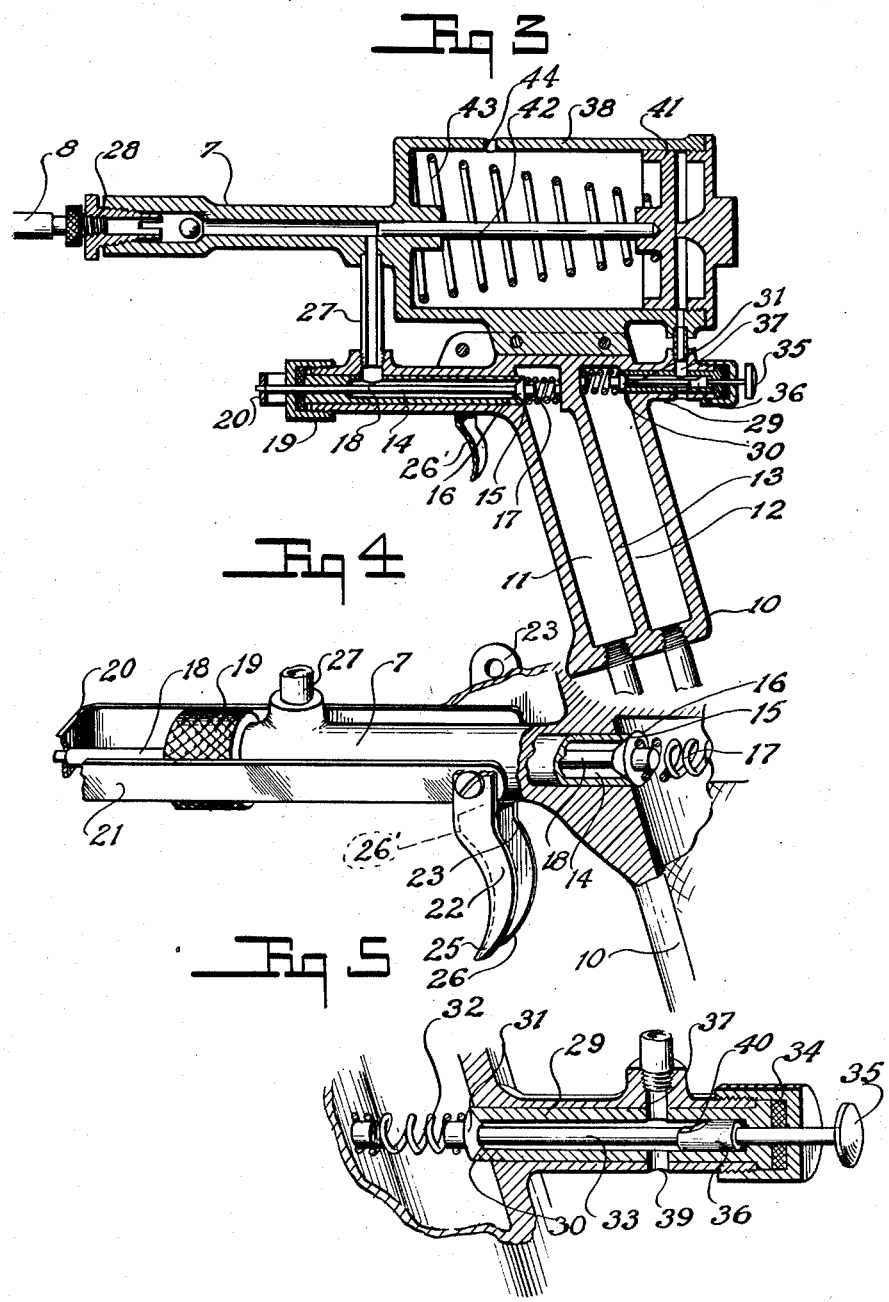

Patented Jan. 14, 1930

1,743,968

UNITED STATES PATENT OFFICE

PAUL L. HATFIELD, OF WICHITA, KANSAS, ASSIGNOR TO GUS V. WINSTON, TRUSTEE, OF WICHITA, KANSAS

GREASE GUN

Application filed December 30, 1927. Serial No. 243,677.

This invention relates to a gun for delivering lubricant to machine parts and particularly to parts of motor vehicles.

It is common practice to utilize compressed air for forcing lubricant through a "gun" into the parts, such as spring shackles and the like, but with the guns commonly used, there is liability of the grease becoming stuck in the gun nozzle so that a free flow is prevented.
This is particularly true where low air pressure is used. With my invention I can utilize comparatively low pressure for normal use and I utilize a nozzle clearing device also actuated by air pressure and utilizing a piston of sufficient area to provide force enough to clear the nozzle of any grease or lubricant which may have a tendency to clog therein. In other words, I have provided a comparatively simple, easily portable "grease gun" through which grease will be delivered under practically any conditions encountered in practice.

In the drawings Fig. 1 is a perspective view of a grease dispensing arrangement to which my invention is applied.

Fig. 2 is a perspective view of the grease gun, the subject matter of my invention, part of the cylinder wall being broken away.

Fig. 3 is a longitudinal sectional view through the gun.

Fig. 4 is a perspective view of the grease valve trigger mechanism and

Fig. 5 is a view partly in section and partly in perspective of the booster or piston controlling valve mechanism.

Referring now to the drawings by numerals of reference, 1 designates a pipe or hose connected to a suitable source of air supply. The pipe communicates with the grease receptable 2 so that pressure will be put upon the grease to force it out through the pipe 3. There is a branch pipe 4 connected to the pipe or hose 1 and it in turn is connected to an air pipe or hose 5. The hose 3 supplies grease to the gun 6 under pressure so that the grease can be forced through nozzle 7 into the flexible pipe 8 having a connection 9 which may be fastened to the shackle or other part to receive the lubricant. All of this in a general way is old. It is not old, however, to use the pressure in an auxiliary way for keeping the nozzle clear of lubricant and for putting sufficient pressure upon the grease to break away "frozen lubricant" or hard matter around the bearings or parts to receive new grease. Therefore, generically, it is this latter feature which constitutes the most important part of my invention.

The gun is provided with a hand-grip 10 in the form of a pistol grip. The hand-grip is provided with two conduits or passageways 11 and 12, the first of which is a grease passage-way and the latter an air passageway, the two being divided by a partition 13. At one end of the passage-way 11 is a right-angular extension to the passage-way 11 in the form of a barrel. The passage-way 14 has a valve seat 15 normally closed by a valve 16, pressed to seating position by the spring 17 bearing against it and the partition 13. A valve stem 18 projects forwardly from the valve 15 through the stuffing-box 19 and it is fastened on the cross-bar 20 of the yoke 21. The yoke 21 is secured to the intermediate portions of the levers 22 and 23. One end of each lever is fastened to the stock portion 24 at the top of the hand-grip. The opposite ends 25 and 26 of the levers are curved to form a trigger, the levers being connected by a cross-bar 26'. Therefore, when the trigger is pulled back, the valve 16 will be unseated so that the grease may pass into the right-angular extension 14, into the unobstructed pipe 27 and into the nozzle 7. The nozzle 7 can be fastened to the flexible pipe or hose 8 by means of the nipple 28 so that grease may flow through the flexible pipe 8 to the point of consumption.

The construction of gun so far described would work very well were it not for the fact that the old grease in the shackles or bearings not infrequently contains dust and dirt so that it is so hard that the pressure of the new grease is insufficient to break down the old grease. With my invention an increased pressure, many times the normal air pressure, can be exerted against the grease in the nozzle so as to break loose any old grease in the part to be lubricated. I will proceed now to describe how I accomplish this very desirable result.

At one end of the passage-way 12 is a right-angular extension or barrel 29 having a valve seat 30 against which the air valve 31 is normally urged by the spring 32 which bears against it and the partition 13. The valve 31 has a valve stem 33 which extends through the stuffing-box 34 and has on its end a push-button 35. Within the extension or barrel 29, fastened on to stem 33, is a cylindrical valve 36 normally beyond the air port 37 for the cylinder 38 and beyond the exhaust port 39. The valve 36 is provided with a cut-away portion 40 which will presently be explained. The cylinder 38 is secured to the stock portion 24 of the hand-grip and it carries a piston or follower 41 having a plunger 42 in the bore of the nozzle 7 with its end normally in rear of the inlet end of the pipe 27. Therefore, so long as the grease will flow through the gun by opening the valve 15, the plunger 42 will not function. If however, the normal low pressure supplied to ports 11, 14, 27 and nozzle 7 is not sufficient to force grease into the part to be lubricated then the operator presses his thumb against the button 35, imparting longitudinal movement to the stem 33 to a sufficient degree to unseat valve 31 and move valve 36 far enough from right to left to close exhaust port 39, but not close port 37. Air at the same pressure, as it enters the receptacle 2, will now pass into cylinder 38 in rear of piston 41, but on account of the relatively large area of piston 41, the pressure exerted by the end of the plunger 42 will be many times that exerted through the ports 11, 14 and 27 and on account of this highly augmented pressure, the grease will be forced through the nozzle 7 and through the pipe 8 into the part to be lubricated. When the operator releases the button 35, the air supply, through valve seat closed by valve 31, will be cut off. The exhaust port 39 will be opened so that air on the pressure side of the piston 41 will exhaust through port 39. Then the coil spring 43 will return the piston to the position shown in Figure 3, withdrawing the plunger out of line with the pipe 27 so that the lubricant will flow direct through the nozzle. It may be necessary in some cases to give the lubricant two or more "shots" of augmented pressure by quickly opening and closing the valve 31, but ordinarily one augmenting operation will be sufficient to break down any stoppage or resistance to the flow of the grease in the nozzle or at points beyond. 44 is a breather port to exhaust air when the piston 41 moves forward to permit air to enter the cylinder when the piston 41 is returned to normal position by the spring 43.

It will be seen that the device has been designed for convenient operation by one hand of the operator, the trigger being operated by the index finger and the valve stem 33 by the thumb.

Various changes may be made without departing from the spirit of my invention so I wish not to be limited to the details of construction shown.

What I claim and desire to secure by Letters-Patent is:—

1. A grease gun comprising a member having a handle with a grease passage-way to supply grease under pressure, a valved passage-way leading from the first passage-way, a right angularly disposed passage-way communicating with the second mentioned passage-way, a nozzle at right angles to the third mentioned passage-way and normally in communication therewith so that when the valve is unseated, grease under pressure may flow direct to the nozzle, a booster cylinder carried by the handle, a piston actuated plunger in the cylinder, movable longitudinally in the nozzle, an air passage-way in the handle to supply air under pressure against the piston and a valve in the air passage-way for admitting and cutting off air to the piston, the valve having a portion normally communicating the part of the cylinder on the power side of the piston with atmosphere.

2. A grease gun comprising a handle having a grease passage-way to supply grease under pressure, a valve passageway communicating with the first passage-way, a nozzle communicating with the second mentioned passage-way through a communicating right angularly disposed passage-way, a cylinder carried by the handle having an opening at one end, a piston in the cylinder, a plunger carried by the piston projectable into the nozzle, the space between the rear end of the piston and the cylinder constituting an air chamber, a horizontally disposed yoke for operating the valve, a finger actuated trigger connecting the yoke to the handle, an air passage-way in the handle to supply air under pressure to the space between the cylinder and the piston and a reciprocatory air controlling valve in the handle in line with the yoke whereby the index finger of the operator may operate the trigger and the thumb of the operator may operate the air valve.

In testimony whereof I affix my signature.

PAUL L. HATFIELD.